United States Patent
Radford et al.

(10) Patent No.: US 8,886,344 B2
(45) Date of Patent: Nov. 11, 2014

(54) EXCHANGE OF METADATA BETWEEN A LIVE SOUND MIXING CONSOLE AND A DIGITAL AUDIO WORKSTATION

(75) Inventors: Sheldon Thane Radford, San Francisco, CA (US); Alasdair D. McKinna, San Francisco, CA (US); Douglas Kirby Sjostrom, San Carlos, CA (US); David John Oppenheim, Woodside, CA (US); Patrice F. de Muizon, Napa, CA (US)

(73) Assignee: Avid Technology, Inc., Burlington, MA (US)

( * ) Notice: Subject to any disclaimer, the term of this patent is extended or adjusted under 35 U.S.C. 154(b) by 576 days.

(21) Appl. No.: 12/877,455

(22) Filed: Sep. 8, 2010

(65) Prior Publication Data

US 2012/0059492 A1 Mar. 8, 2012

(51) Int. Cl.
*G06F 17/00* (2006.01)
*H04H 60/04* (2008.01)
*H04H 60/73* (2008.01)

(52) U.S. Cl.
CPC .............. *H04H 60/04* (2013.01); *H04H 60/73* (2013.01)
USPC ............................................................ 700/94

(58) Field of Classification Search
USPC ............................ 700/94; 381/119; 369/1–12; 704/500–504
See application file for complete search history.

(56) References Cited

U.S. PATENT DOCUMENTS

| | | | |
|---|---|---|---|
| 2002/0193894 A1* | 12/2002 | Terada et al. ................... | 700/94 |
| 2003/0055518 A1* | 3/2003 | Aiso et al. ....................... | 700/94 |
| 2004/0133291 A1* | 7/2004 | Nakayama et al. ............. | 700/94 |
| 2005/0025321 A1* | 2/2005 | Ajamian ....................... | 381/119 |
| 2006/0015200 A1* | 1/2006 | Takemura et al. ............. | 700/94 |
| 2006/0064187 A1* | 3/2006 | Nishikori et al. .............. | 700/94 |
| 2010/0179673 A1* | 7/2010 | Muroi ............................ | 700/94 |
| 2011/0064249 A1* | 3/2011 | Jang et al. .................... | 381/119 |

OTHER PUBLICATIONS

Milne, Steve et al., "EuCon: An Object-Oriented Protocol for Connecting Control Surfaces to Software Applications", Audio Engineering Society Convention Paper, Presented at the 121st Convention, Oct. 5-8, 2006, pp. 1-11.
Yamaha, 02R96 Digital Mixing Console Owners Manual, Chapter 18, "Pro Tools Remote Layer", Apr. 15, 2002, pp. 169-175.

\* cited by examiner

*Primary Examiner* — Andrew C Flanders
(74) *Attorney, Agent, or Firm* — Oliver Strimpel

(57) ABSTRACT

A system for transferring metadata between an audio mixing console and a digital audio workstation connected by an audio link and a computer network. The audio mixing console and the digital audio system implement an Ethernet-based communication protocol for sending messages between them over the network connection, the messages including metadata specifying a plurality of settings on the audio mixing console corresponding to audio information received by the audio mixing console during a live performance. The audio information is sent to the digital audio system over the high bandwidth connection. The high bandwidth connection can also be used to transfer the metadata. The transfer of metadata between the console and the digital audio workstation facilitates new digital audio archiving, virtual live mixing, and virtual soundcheck workflows.

16 Claims, 1 Drawing Sheet

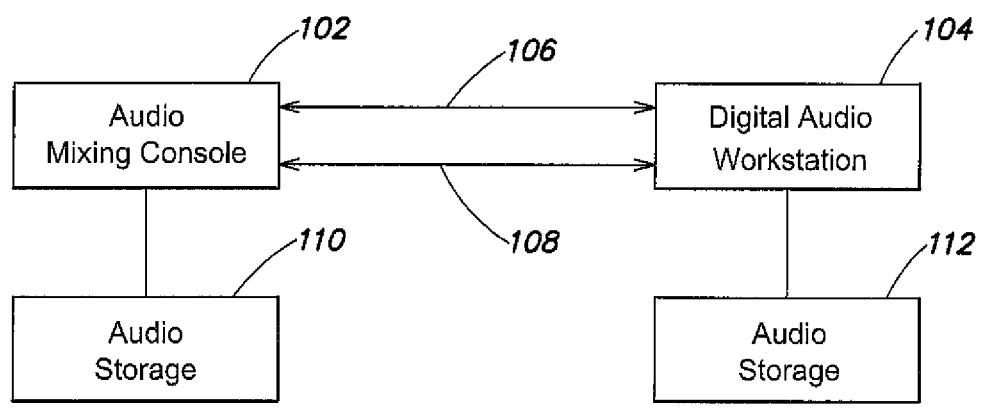

EXCHANGE OF METADATA BETWEEN A LIVE SOUND MIXING CONSOLE AND A DIGITAL AUDIO WORKSTATION

BACKGROUND

During a live sound performance, the audio signals from the performers are sent to a live sound mixing console, where an operator uses the console controls to mix the audio signals together to produce the sound heard by the audience. Mixing consoles typically have a large number of controls, including faders for controlling the volume of each audio channel, equalization controls, as well as controls for various effects mediated by plug-in software modules. If a live performance is to be recorded, audio streams are passed to a recording device or to a digital audio workstation (DAW) for storing on a computer-readable storage device. Current techniques for live sound mixing and using a DAW for recording the show involve sending audio streams, signals for time synchronization, and transport control (e.g., play, pause, stop) from the console to the DAW. After a performance is recorded, the DAW has a session lasting the duration of the performance, often with no indication as to which parts of the recorded session correspond to key points in a performance where the mix might change, for example at the start of a new song. Furthermore, no information as to the routing assignments of the inputs and outputs, or the names of the track sources are available at the DAW. In order to create a new session, the DAW operator needs to assign the mixing console input/output paths to their corresponding DAW tracks, and manually label all the tracks. Since shows often have dozens of tracks, sometimes in excess of 100 tracks, this process can be time-consuming and error prone. Furthermore, the work is largely duplicative of the set-up already performed by the mixing console operator when setting up the live mix.

In addition to recording a show, another common use of a DAW connected to a mixing console is to perform a virtual soundcheck, in which a recording of a previous performance is played back through the console in the new venue. The engineer plays the previously recorded tracks of each instrument, and adjusts the mix to sound appropriate in the new venue. Currently, when playing back a previously recorded concert from a DAW during a soundcheck, it is not possible to synchronize the DAW and the live sound console to facilitate switching from one sound or piece to the next.

SUMMARY

In general, the invention features implementing a computer network protocol between the mixing console and the DAW for passing metadata between the console and the DAW. This enables a tighter integration between the two systems, permitting more efficient and less error prone workflows for archiving, performing soundchecks, and offline remixing.

In general, in one aspect, a system for processing digital audio includes an audio mixing console, a digital audio workstation, a high bandwidth connection between the audio mixing console and the digital audio workstation for transferring audio information, and a network connection between the audio mixing console and the digital audio workstation. The audio mixing console and the digital audio workstation implement a communication protocol for sending messages between the audio mixing console and the digital audio workstation over the network connection, the messages including metadata specifying a value for each of a plurality of settings on the audio mixing console, with each value defining a state of the corresponding setting that was used to mix audio information received by the audio mixing console during a live performance.

Various embodiments include one or more of the following features. The received audio information is sent to the digital audio workstation over the high bandwidth connection. The metadata is sent from the audio mixing console to the digital audio workstation, and the digital audio workstation is used to edit the metadata to create edited metadata corresponding to an offline remix of the audio information. The edited metadata is transferred to the audio mixing console, and the edited metadata corresponding to the offline remix is used to set console settings for mixing live audio information received by the audio mixing console. The audio mixing console enables an operator to capture a set of values for the plurality of settings used to mix received audio information corresponding to a selected program element of the live performance, and the captured set of values is sent to the digital audio workstation, which associates the captured set of values with a temporal location within the audio information. The digital audio workstation enables an operator to select the temporal location within the received audio information, and cause the digital audio workstation to transfer the captured set of values to the audio mixing console, which, in response to receiving the captured set of values, adjusts values of the plurality of settings to correspond to the captured set of values. The audio mixing console enables the operator to request over the computer network the audio information from the digital audio workstation corresponding to the selected program event, and receive over the high bandwidth connection the audio information corresponding to the selected program event, and the mixing console automatically adjusts the values of the plurality of settings to correspond to the captured set of values. The digital audio workstation receives the audio information over the high bandwidth network and receives the metadata over the network connection, and the digital audio workstation stores the metadata in association with the audio information on a computer readable storage system connected to the digital audio workstation. The audio information represents a temporal sequence of audio samples, and the metadata specifies a value of each of the plurality of settings corresponding to each of the audio samples. The plurality of settings includes settings of faders on the audio mixing console. The plurality of settings includes a list of plug-in modules used to process the audio information on the audio mixing console. The plurality of settings includes settings of one or more of the plug-in modules. The communication protocol is an Ethernet protocol.

In general, under another aspect, a system for processing digital audio includes an audio mixing console, a digital audio workstation, and a high bandwidth connection between the audio mixing console and the digital audio workstation, and the audio mixing console and the digital audio workstation implement a communication protocol for transferring over the high bandwidth connection audio information received by the audio mixing console during a live performance, and wherein metadata specifying values of a plurality of settings of the audio mixing console that were used to mix the received audio information during a live performance is transferred over the high bandwidth network in association with the received audio information. In various embodiments the high bandwidth connection is at least one of a FireWire connection and a USB connection.

BRIEF DESCRIPTION OF THE DRAWINGS

FIG. 1 is a high level block diagram of a live sound mixing console and a digital audio workstation connected by an audio connection and a computer network connection.

DETAILED DESCRIPTION

The lack of high level communication between existing audio mixing consoles and digital audio workstations severely limits the ways in which these two units can work together, and results in the cumbersome, duplicative workflows referred to in the background section above. The systems and methods described herein address this problem by implementing a data connection between the console and the workstation. The data connection enables the bidirectional transfer of metadata between the console and the workstation, thereby enabling new workflows and expanded functionality.

Referring to FIG. 1, audio mixing console 102 is connected to digital audio workstation 104 by audio connection 106, such as a FireWire®, Multichannel Audio Digital Interface (MADI) or a DigiLink™ connection, which carries the digital audio information between the mixing console and the DAW. The audio connections may involve a special purpose audio interface card, such as for example the HD, FW, and MADI series of cards available from Avid Technology, Inc., of Burlington Mass. Examples of commercially available audio mixing consoles feature in the VENUE live systems; examples of commercially available DAWs include the Pro Tools® system, both available from Avid Technology, Inc.

Network connection 108 is established between the console and the DAW to enable them to communicate with each other. This connection can either be direct or via a larger local area or wide area network. In the described embodiment, the connection is implemented as an Ethernet network. In other embodiments, the connection is a wireless Ethernet, USB connection, or implemented using any available network protocol.

The live audio console and the DAW each include network connection interfaces, such as standard Ethernet interface cards, or interface hardware incorporated within the system motherboard. The console and the DAW may also each include a general purpose computer and software for audio processing and manipulation, as described below, and may be connected to audio storage 110 and 112 respectively, and/or to remote audio storage (not shown) connected to the console and the DAW via a local area or wide area network, including network 108. Audio storage may be implemented as one or more solid state, optical, or disc-based storage units. The console is provided with a range of inputs for receiving audio information from performing instruments (not shown).

The metadata transferred between the mixing console and the DAW represents the various configurations and settings of the mixing console. Examples of the types of metadata transferred over the network connection include: information about an audio file transferred over audio connection 106, such as the file name, time, date, and location of the performance; audio path routing specifying the routing of each of the mixing console's inputs to an output and a mixing console channel name or number; channel strip names; stereo channel assignments; console snapshot names; console actions such as snapshot store or recall, which enable the corresponding time locations in the live performance to be indicated in the DAW recording; and console settings such as fader and mute controls, EQ and dynamics settings. In addition, DAW transport controls (e.g., stop, play, pause, rewind, fast forward, locate to previous/next marker, enable record, disable record) may be sent over network connection 108 to control the DAW transport remotely. The mixing console may be using one or more software plug-in modules to perform various functions, such as adding special effects and reducing noise, each of which usually offers the operator a range of controllable settings and parameters. Information capturing plug-in settings and parameters may also be transferred over computer network 108. In sum, the computer network connection enables the transfer of a complete specification of the operator-facing state of an audio mixing console, including both the physical and software controls.

We now describe three illustrative workflows that are enabled by the link described above: archiving, virtual live mix, and virtual soundcheck.

In the archiving workflow, a live performance is recorded using a DAW. Prior to the implementation of computer network link 108, only audio information was passed to the DAW over audio link 106. At the end of the performance, the DAW received an audio file representing the full duration of the performance, without any indication as to where in the audio the various songs or pieces start and stop. It was necessary for recording operators to review the audio, and manually insert markers to mark locations of interest, and enter a name or other descriptor of the marked location.

The addition of network connection 108 permits the audio console to transfer a range of metadata describing the live performance that effectively sets up a new session at the DAW. The session information, which previously was entered manually, include one or more of the following: routing assignments for all the inputs and outputs to a track; names of each of the tracks; the names of each song or piece; and the instruments in the live mix. A process that would require a considerable amount of a skilled operator's time is accomplished automatically in a few seconds, and with a reduced chance of error.

In the second workflow, the ready transfer of metadata from the console to the DAW facilitates virtual live mixing, i.e., the ability to mix the live performance without using the mixing console or being physically present in a performance venue. An important use of virtual live mixing is to create a remix of the live performance for distribution, e.g., as a CD or download. Since remixes of live performances are intended to recreate the sound and ambience of the live performance, albeit in a different environment such as in the home, many of the remix settings are not expected to depart far from those of the original live mix. It is therefore a major benefit for the remix engineer to be able to use the live mix settings as a starting point when creating the remix. These live mix settings are received directly via network connection 108, as described above in connection with the archiving workflow.

Another application of virtual live mixing is to adjust the live mix for use in a subsequent live performance. With the settings of the live mix ingested into the DAW, a mixing engineer has a recreation of the live mix on the DAW, and can adjust the mix offline. Console and plug-in settings may be refined without the time restrictions that normally characterize an operator's access to the live mixing console in the performance venue. Once the engineer's adjustments are complete, the adjusted mix settings are sent back to mixing console 102 over network connection 108, and are now available for use in the console for a subsequent performance.

In the virtual soundcheck workflow, a recorded live performance session on the DAW substitutes for live input from the performers. When performing the virtual soundcheck, the console operator requests a portion of a session of a previous live performance, and receives the audio over audio connection 106 and the settings over network connection 108 from the DAW. The operator then uses the previously recorded live mix settings as the starting point to adjust for any changes required to suit the characteristics of the new venue. The system further enables the operator to jump directly to each temporal location within a performance that may require its own mix. For example, in a rock concert, each song may have its own mix settings. When a previous show was mixed, the console operator captured each song's mix settings by capturing a snapshot (referred to herein as "snapshot recall"). The settings corresponding to the snapshot are transferred to the DAW, which in turn places a marker in the session identifying the temporal location in the audio at which the snapshot was captured. The marker may be named, e.g., with a name of the song. When playing back a recorded session to perform a virtual soundcheck, the console operator may jump to each of the markers, setting the console to the corresponding snapshot recall settings, and sending a command over network connection 108 to jump to the marker location corresponding to the snapshot recall, enabling the operator to perform checks for each song without having to search through the recorded session.

In addition to passing metadata between the DAW and the console, the network protocol established over network connection 108 also permits the communication of transport controls, as described in U.S. patent application Ser. No. 12/082,767, which is incorporated herein by reference. This enables a console operator to control the DAW's payback functions, such as start, stop, and rewind and fast forward.

The metadata may be transferred over network connection 108 in asynchronous or synchronous mode. In asynchronous transfer, the transfer of data is initiated either at the console or at the DAW by operator action. In one workflow, a bulk transfer of console settings from the console to the DAW occurs during a set-up stage when the DAW user creates a project, often referred to as a session file. This metadata includes setup information, such as configuration information, track names, and routing assignments. Subsequently, during a live performance, additional data sets are pushed from the console to the DAW, for example each time the console operator performs a snapshot recall. Upon receipt of the snapshot recall action, the DAW places a marker in a session timeline, and associates the transferred settings with the audio segment lying between that marker and a subsequent marker.

During virtual soundcheck the mixing console may pull settings from the DAW, for example pulling in turn the settings corresponding to each of the snapshot recalls. Recalling the snapshot may also cause the DAW to jump to the marker in the session timeline corresponding the snapshot recall, and the operator then starts playing back the audio from that point. Since communication between the console and the DAW is bidirectional, when a DAW operator jumps to a marker position, a message may be sent to the console to cause it to recall the corresponding snapshot settings. The console also pulls settings from the DAW when the operator wishes to use a virtual remix, for example a remix created in between two performances on a tour to adjust sound characteristics of a previous performance, as described above in connection with the virtual remix workflow.

Synchronous metadata transfer is performed to capture real-time settings on the console. Real-time metadata transfer captures continuous operator adjustments of console or plug-in settings during a performance. Such real-time data is captured in the DAW as an individual track associated with each of the sources, i.e., instruments, and may be handled as automation data in the context of Pro Tools DAW systems. In order for the DAW to be able to associate metadata transferred over network connection 108 with a corresponding temporal location within the audio recording, the metadata is transferred in synchrony with the audio. Sample-accurate synchrony is not achieved in this manner, but the achievable accuracy is generally adequate to avoid any noticeable synchronization problems. In other embodiments, a common time reference is used, such as an external time reference connected to both the console and the DAW. Alternatively, a time reference within the console is used to time-stamp the metadata, such as with an offset from a reference location within the audio data.

There is no effective limit on the length of audio connection 106 and network connection 108. For example, the connections may be hundreds of meters, or even several kilometers long when connecting a mixing console located in a main hall of a performance center with a DAW located in a broadcasting facility several floors away in the same building, or in a different building.

In the described embodiment, the data sent over network 108 is packetized using a modified version of the protocol and format implemented in Satellite Link, a protocol that is used to connect multiple digital audio workstations together with each other, and optionally together with digital video systems in order to synchronize playback of the systems, as described in U.S. patent application Ser. No. 12/082,767. Details of an example implementation for a packet format for Ethernet-based communication over the network connection 108 will now be described. In general, both the audio mixing console and the DAW include a computer program executing on a computer system within each of the console and DAW, the computer systems acting to processes incoming messages and send out messages that utilize the same packet format.

Network connection 108 is set up within the DAW by a dialog in a peripherals set up pane. The DAW operator optionally provides a name for the DAW that will identify that system to consoles and other DAWs connected to the network. Another area in the set-up pane allows the operator to select whether the DAW is to honor requests to connect from an audio console, and to select which systems to connect to by selecting one of: none; all consoles on a local subnet; all consoles on other subnets previously connected to; and a console with a specific IP entered by the operator. For each connected console, the pane indicates whether the connection is inactive or connected. Other pane areas may be included to enable the operator to specify parameters associated with markers (in the DAW) and snapshot recalls (in the console), and to select network settings, such as an Ethernet interface used for the protocol, and the type and port number for the protocol to use.

Command packets sent over the Ethernet-based network begin with a header, which includes a command ID, length, checksum, destination IP and source IP addresses, error codes, a packet serial number, a reply flag, a protocol version, and a system type specifying the sender's type of system (e.g., DAW type, console type). The packet payload includes data for the specified command type. Example byte formatting for such a packet is provided in the following table:

| | |
|---|---|
| Command ID | 4 bytes |
| Data Length | 2 bytes |
| Checksum | 2 bytes |
| Destination IP Address | 4 bytes |
| Source IP Address | 4 bytes |
| Error Code | 4 bytes |
| Packet Serial Number | 4 bytes |
| Reply Flag | 1 byte |

-continued

| | |
|---|---|
| Major Protocol Version | 1 byte |
| Minor Protocol Version | 1 byte |
| Command Version | 1 byte |
| System Type | 1 bytes |
| Payload | n bytes |

Several commands may be used in this protocol. An example list of commands and their functions are the following. Each command has a unique value that is used to set the command field type in the packet header. Actual values used to designate each command are up to the implementation.

DiscoveryRequest. This message may be broadcast or directed to a specific address to discover connected systems.

Connect. This message is sent to establish a connection. It is only sent in one direction, and may be initiated from either end.

Disconnect. This message is sent to terminate a connection.

SetPrefs. This message is sent when a connection goes online, and may be sent either by the console or the DAW when preferences are set explicitly.

SnapshotRecalled. This message is sent by a console whenever a snapshot is recalled and includes the snapshot ID and name.

MarkerRecalled. This message is sent by a DAW whenever a marker with an associated snapshot is recalled and includes the snapshot ID.

SnapshotRenamed. This message is sent by the console when a snapshot is renamed and includes the new name.

MarkerRenamed. This message is sent by the DAW when a marker with an associated snapshot is renamed and includes the snapshot ID and new marker name.

GetNumberofSnapshots. This message is sent by the DAW when building a menu of console snapshots in an edit marker dialog area to enable a user to choose a snapshot to associate with an existing marker.

GetSnapshotName. This message is also sent by the DAW when building a menu of console snapshots in an edit marker dialog area to get the name associated with a specific snapshot.

GetNumberofConnections. This message is sent by the DAW when importing track names, or creating a session from the console to obtain the number of channels and assignable outputs in use by the current console show file.

GetConnectionInfo, This message is sent by the DAW when importing track names or creating a session to obtain input and output connection routing.

TransportCommand. This message is sent by the console when an event is triggered which corresponds to a DAW transport command, and includes the ID of the transport command.

GetTransportState. This message is sent by the console to query the DAW transport state.

TransportStateChanged. This message is sent by the DAW whenever its transport state changes and includes the new transport state.

Multiple DAWs may be connected to a single console for redundant recording. In this situation, multiple instances of the described protocol run simultaneously, each one directed to systems on different IP addresses. In some embodiments, the two DAWs are connected using the Satellite Link communication protocol described in U.S. patent Ser. No. 12/082,767.

In another workflow, network connection 108 is used to perform a bulk transfer or a synchronization of preset libraries between the console and the DAW. Such presets are accumulated by an operator for various situations, and include settings of the various console parameters described above, such as EQ or plug-in settings. These preset files can be applied when creating a new session on the DAW, or to accelerate soundchecks.

In other embodiments, metadata is transferred between an audio mixing console and a DAW without using a separate computer network connection, but rather via audio connection 106. In some audio transfer protocols, bandwidth may be reserved for transferring control data, such as handshaking signals between a DAW and a peripheral. This bandwidth may be used to transfer the metadata specifying a state of an audio mixing console. In some embodiments that implement FireWire and/or USB interfaces, the metadata is transferred using TCP-IP. The operating systems running on the computers within the audio mixing console and the DAW are configured to support this protocol by treating their FireWire and/or USB ports as network connections, and by installing the appropriate drivers. The software running on the DAW and the audio console are adapted to make these ports available as options in their respective peripherals dialogs.

The various software components of the audio mixing console and DAW systems described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic or optical discs, which may include an array of local or network attached discs.

The various computer-executable programs described herein may be implemented in software or hardware or firmware, or a combination of the three. The various elements of the system, either individually or in combination may be implemented as one or more computer program products in which computer program instructions are stored on a computer readable medium for execution by a computer, or transferred to a computer system via a connected local area or wide are network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A system for processing digital audio, the system comprising:
    an audio mixing console;
    a digital audio workstation;
    a high bandwidth connection between the audio mixing console and the digital audio workstation for transferring audio information; and
    a network connection between the audio mixing console and the digital audio workstation;
    wherein the audio mixing console and the digital audio workstation implement a communication protocol for sending messages between the audio mixing console and the digital audio workstation over the network connection, the messages including metadata specifying a value for each of a plurality of settings on the audio mixing console, wherein each value defines a state of the corresponding setting that was used to mix audio information received by the audio mixing console during a live performance;
    wherein the received audio information is sent to the digital audio workstation over the high bandwidth connection; and
    wherein the metadata is sent from the audio mixing console to the digital audio workstation, and wherein the digital audio workstation is used to edit the metadata such that an edited value of at least one of the settings differs from a corresponding value of the setting that was used to mix audio information received by the audio mixing console during a live performance.

2. The system of claim 1, wherein the metadata is edited to create an offline remix of the audio information.

3. The system of claim 2, wherein the edited metadata is transferred to the audio mixing console, and the edited metadata corresponding to the offline remix is used to set console settings for mixing live audio information received by the audio mixing console.

4. The system of claim 1, wherein the audio mixing console enables an operator to capture a set of values for the plurality of settings used to mix received audio information corresponding to a selected program element of the live performance, and wherein the captured set of values is sent to the digital audio workstation, the digital audio workstation associating the captured set of values with a temporal location within the audio information.

5. The system of claim 4, wherein the digital audio workstation enables an operator to select the temporal location within the received audio information, and cause the digital audio workstation to transfer the captured set of values to the audio mixing console, and wherein, in response to receiving the captured set of values, the audio mixing console adjusts values of the plurality of settings to correspond to the captured set of values.

6. The system of claim 4, wherein the audio mixing console enables the operator to request over the computer network the audio information from the digital audio workstation corresponding to the selected program event, and receive over the high bandwidth connection the audio information corresponding to the selected program event, and wherein the mixing console automatically adjusts the values of the plurality of settings to correspond to the captured set of values.

7. The system of claim 1, wherein the digital audio workstation stores the metadata in association with the audio information on a computer readable storage system connected to the digital audio workstation.

8. The system of claim 1, wherein the audio information represents a temporal sequence of audio samples, and wherein the metadata specifies a value of each of the plurality of settings corresponding to each of the audio samples.

9. The system of claim 1, wherein the plurality of settings includes settings of faders on the audio mixing console.

10. The system of claim 1, wherein the plurality of settings includes a list of plug-in modules used to process the audio information on the audio mixing console.

11. The system of claim 10, wherein the plurality of settings includes settings of one or more of the plug-in modules.

12. The system of claim 1, wherein the communication protocol is an Ethernet protocol.

13. A system for processing digital audio, the system comprising:
    an audio mixing console;
    a digital audio workstation; and
    a high bandwidth connection between the audio mixing console and the digital audio workstation,
    wherein the audio mixing console and the digital audio workstation implement a communication protocol for transferring over the high bandwidth connection audio information received by the audio mixing console during a live performance, and wherein metadata specifying values of a plurality of settings of the audio mixing console that were used to mix the received audio information is transferred over the high bandwidth connection in association with the received audio information;
    wherein the received audio information is sent to the digital audio workstation over the high bandwidth connection; and
    wherein the metadata is sent from the audio mixing console to the digital audio workstation, and wherein the digital audio workstation is used to edit the metadata such that an edited value of at least one of the settings differs from a corresponding value of the setting that was used to mix audio information received by the audio mixing console during a live performance.

14. The system of claim 13, wherein the high bandwidth connection is at least one of a FireWire connection and a USB connection.

15. A system for processing digital audio, the system comprising:
- an audio mixing console;
- a digital audio workstation;
- a high bandwidth connection between the audio mixing console and the digital audio workstation for transferring audio information; and
- a network connection between the audio mixing console and the digital audio workstation;
- wherein the audio mixing console and the digital audio workstation implement a communication protocol for sending messages between the audio mixing console and the digital audio workstation over the network connection, the messages including metadata specifying a value for each of a plurality of settings on the audio mixing console, wherein each value defines a state of the corresponding setting that was used to mix audio information received by the audio mixing console during a live performance;
- wherein the audio mixing console enables an operator to capture a set of values for the plurality of settings used to mix audio information corresponding to a selected program element of the live performance, and wherein the captured set of values is sent to the digital audio workstation, the digital audio workstation associating the captured set of values with a temporal location within the audio information; and
- wherein the audio mixing console enables the operator to request and receive over the computer network the audio information from the digital audio workstation corresponding to the selected program event, and wherein the mixing console automatically adjusts the values of the plurality of settings to correspond to the captured set of values.

16. A system for processing digital audio, the system comprising:
- an audio mixing console;
- a digital audio workstation, wherein the digital audio workstation;
- a high bandwidth connection between the audio mixing console and the digital audio workstation for transferring audio information; and
- a network connection between the audio mixing console and the digital audio workstation;
- wherein the audio mixing console and the digital audio workstation implement a communication protocol for sending messages between the audio mixing console and the digital audio workstation over the network connection, the messages including metadata specifying a value for each of a plurality of settings on the audio mixing console, wherein each value defines a state of the corresponding setting that was used to mix audio information received by the audio mixing console during a live performance;
- wherein the audio mixing console enables an operator to capture a set of values for the plurality of settings used to mix audio information corresponding to a selected program element of the live performance, and wherein the captured set of values is sent to the digital audio workstation, the digital audio workstation associating the captured set of values with a temporal location within the audio information; and
- wherein the digital audio workstation enables an operator to select the temporal location within the received audio information, and cause the digital audio workstation to transfer the captured set of values to the audio mixing console, and wherein, in response to receiving the captured set of values, the audio mixing console adjusts values of the plurality of settings to correspond to the captured set of values.

\* \* \* \* \*